United States Patent [19]
MacKenna et al.

[11] Patent Number: 5,319,753
[45] Date of Patent: Jun. 7, 1994

[54] QUEUED INTERRUPT MECHANISM WITH SUPPLEMENTARY COMMAND/STATUS/MESSAGE INFORMATION

[75] Inventors: Craig A. MacKenna, Los Gatos; Hanumanthrao Nimishakavi, Fremont; Ravi Swami, San Jose, all of Calif.

[73] Assignee: Zilog, Inc., Campbell, Calif.

[21] Appl. No.: 953,732

[22] Filed: Sep. 29, 1992

[51] Int. Cl.$^5$ .............................................. G06F 13/24
[52] U.S. Cl. ..................................... 395/275; 395/425
[58] Field of Search ............... 395/275, 250, 425, 725; 340/172.5; 364/230.2, 600, 601, 280.8

[56] References Cited

U.S. PATENT DOCUMENTS

| | | |
|---|---|---|
| 4,005,391 | 1/1977 | MacPherson ..................... 340/172.5 |
| 4,275,440 | 6/1981 | Adams, Jr. et al. ................ 364/200 |
| 4,400,773 | 8/1983 | Brown et al. ...................... 364/200 |
| 4,438,489 | 3/1984 | Heinrich et al. ................... 364/200 |
| 5,133,056 | 7/1992 | Miyamori ........................... 364/200 |
| 5,195,864 | 2/1993 | Bonevento et al. ................ 395/275 |

*Primary Examiner*—Arthur G. Evans
*Assistant Examiner*—Sang Hui Kim
*Attorney, Agent, or Firm*—Majestic, Parsons, Siebert & Hsue

[57] ABSTRACT

A bidirectional interrupt technique and mechanism is described for handling programmable length interrupt messages between two devices, preferably both processors, through dual, programmably defined memory queues. The technique and mechanism automatically updates a read and write address counter, a queue count register, and an interrupt count register for each direction of the flow of interrupts.

11 Claims, 5 Drawing Sheets

| Device 10' Pseudo Register Address | read | write |
|---|---|---|
| xFF2 | OIQ Read, decr OIQ Interrupt Ctr | IIQ Write, incr IIQ Interrupt Ctr |
| xFF3 | OIQ Read | IIQ Write |

FIG._5A.

| Device 10" Pseudo Register Address | read | write |
|---|---|---|
| xFF6 | IIQ Read, decr IIQ Interrupt Ctr | OIQ Write, incr OIQ Interrupt Ctr |
| xFF7 | IIQ Read | OIQ Write |

FIG._5B.

QUEUED INTERRUPT MECHANISM WITH SUPPLEMENTARY COMMAND/STATUS/MESSAGE INFORMATION

BACKGROUND OF THE INVENTION

This invention relates in general to queued interrupt techniques in computer systems and in particular, to a technique and mechanism for controlling the queuing and subsequent reading of interrupt information in either direction between two processors.

In computer systems, an interrupted processor frequently requires additional information from an interrupting device in order to properly respond to an interrupt. For example, when the interrupted processor executes an interrupt service routine ("ISR") in response to the interrupt, the ISR first ascertains the exact kind of external event that caused the interrupt, then it performs various actions responsive to that event.

In order to minimize the number of program steps and consequently, the execution time that the ISR must spend on ascertaining what kind of event has occurred, special hardware may be implemented so that for each interrupt, the interrupted processor initiates a special kind of bus cycle called an "interrupt acknowledge cycle." In this cycle, the interrupted processor typically reads an interrupt vector generated by the interrupting device that provides certain identification information about what kind of event caused the interrupt. The processor then typically uses the interrupt vector thus obtained as an index or pointer to select a starting address for the appropriate ISR to be executed from a table of such addresses. Additional information, if necessary, can then subsequently be obtained by the selected ISR.

It is also sometimes desirable to form interrupt queues between devices, and to facilitate the organized writing and reading of interrupt information into and out of such queues by the respective interrupting and interrupted devices. For example, since the processing initiated by an interrupt may take some time, the interrupting device may again develop a need to interrupt the interrupted device for a similar or different reason or event during such interrupt processing time. In such a case, the not-yet-acted-upon interrupts are stored in a queue which the interrupted device can access and later act upon when it is free to do so.

OBJECTS AND SUMMARY OF THE INVENTION

In many systems, it is useful for an interrupting device to pass more information than just an interrupt vector to an interrupted processor. Such additional information flowing from a higher-level or supervisory processor to a lower-level or slave processor is commonly called "Commands," while information in the other direction is commonly called "Status." Information that doesn't fit these categories is simply called "Messages."

Accordingly, one object of the present invention is to provide an interrupt mechanism that facilitates the passing of interrupt vectors and associated supplementary command/status/message information (hereinafter referred to as "items of interrupt information") generated by one device to another device.

Another object of the present invention is to provide an interrupt mechanism that facilitates not only the passing of interrupt information between devices, but also the queuing and subsequent reading of such queued interrupt information by the device being interrupted.

Still other objects of the present invention are to provide a queued interrupt mechanism that is flexible with respect to the type and amount of interrupt information that can be sent by one device to another, and that minimizes the amount of execution time required by the interrupted processor when processing interrupts directed towards it.

These and additional objects are accomplished by the various aspects of the present invention. One aspect of the invention accomplishes one or more of these objects by a flexible queue structure wherein the starting address, size and contents of a queue are programmable.

Another aspect is a dual queue structure used for passing interrupt information in both directions between two processors. One queue, called an "inbound interrupt queue," ("IIQ") is used for passing interrupt information from a first processor to a second processor, and a second queue, called an "outbound interrupt queue," ("OIQ") is used for passing interrupt information in the other direction, i.e., from the second processor to the first processor. The starting locations, queue sizes, and contents of both the IIQ and OIQ are individually definable.

Another aspect is a queued interrupt technique and mechanism which uses a circular buffer scheme for each queue. Each queue's circular buffer has a "write pointer" and a "read pointer" to keep track of the last address at which an item of interrupt information has been written to or read from. Each time an item of interrupt information is written to the queue, the "write pointer" is incremented, and each time an item of interrupt information is read from the queue, the "read pointer" is incremented. When either pointer reaches the end of the circular buffer, the pointer is "rolled back" to the starting queue address by selectively blocking the carry chain in the logic that performs the incrementing function.

Another aspect is a queued interrupt technique and mechanism which uses two counters for each queue. This two counter scheme is useful for passing variable numbers of items of interrupt information from an interrupting device to an interrupted processor. One counter, called an "interrupt counter," keeps track of the number of interrupts transmitted by the interrupting device, but not yet acted upon by the interrupted processor. The other counter, called a "queue counter," keeps track of the number of items of interrupt information which have been transmitted by the interrupting device, but not yet read by the interrupted processor.

The number of items of interrupt information associated with each interrupt can be either preagreed to between software on the interrupting and interrupted processors, or determined according to a protocol or set of rules whereby the number of subsequent items can be determined from preceding items of interrupt information. Each time an interrupt is initiated or acknowledged along with the passing or reading of an item of interrupt information, the simultaneous incrementing or decrementing of the queue and interrupt counters can be done either in hardware by a hardwired interrupt or interrupt acknowledge signal, or in software by an appropriate "pseudo register address" which is decoded and acted upon by control logic. When subsequent items of interrupt information are then passed or read following the initial item of interrupt information, the queue counter, but not the interrupt counter, can then be incremented or decremented by another "pseudo register address" which is also decoded and acted upon by the control logic.

Additional objects, features and advantages of the various aspects of the present invention will become apparent from the following description of its preferred embodiment, which description should be taken in conjunction with the accompanying drawings.

DETAILED DESCRIPTION OF THE PREFERRED EMBODIMENT

Figure 1:
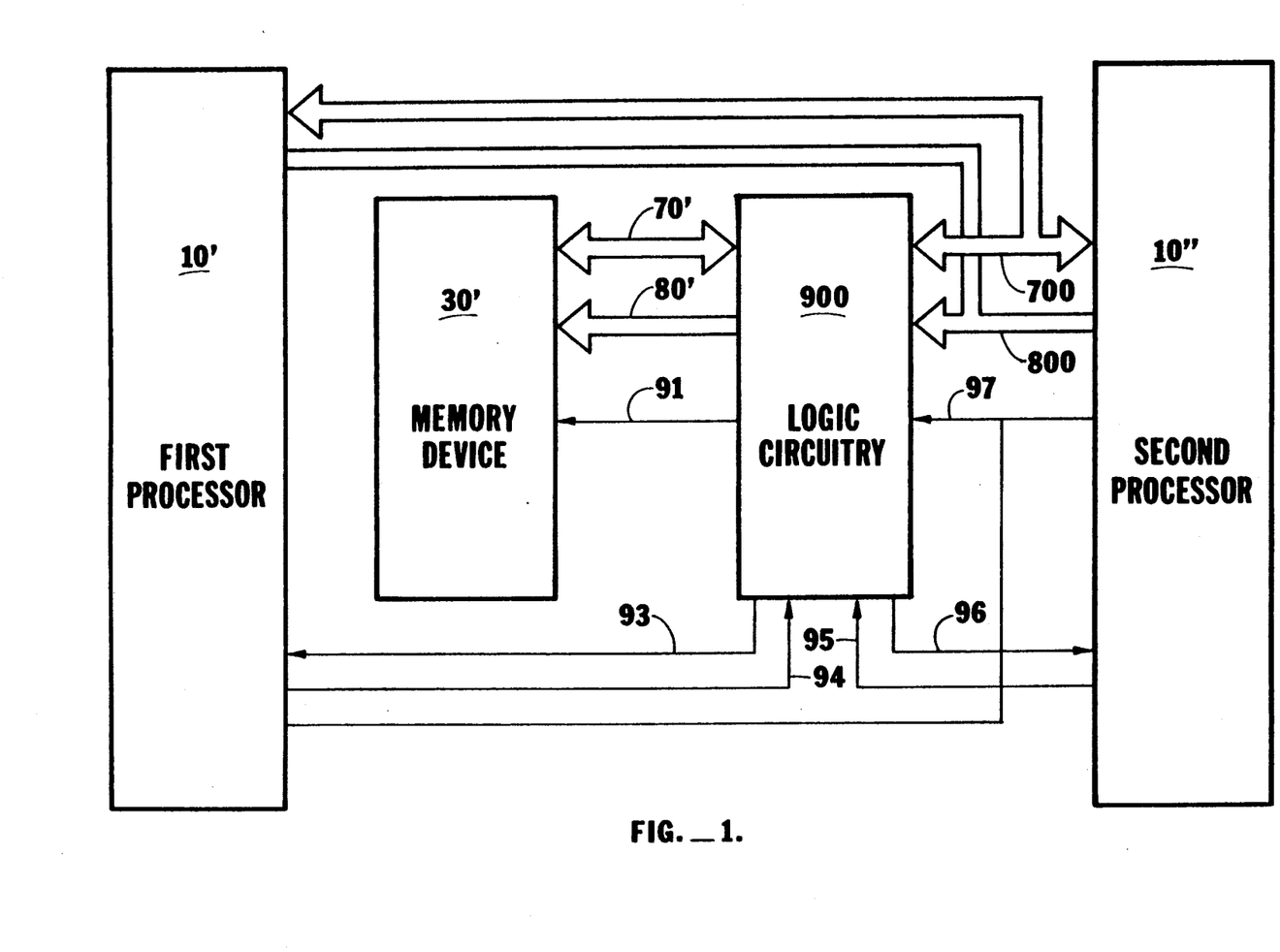
FIG. 1 illustrates, as an example, a block diagram of a bidirectional interrupt mechanism utilizing aspects of the present invention.
Figure 2:
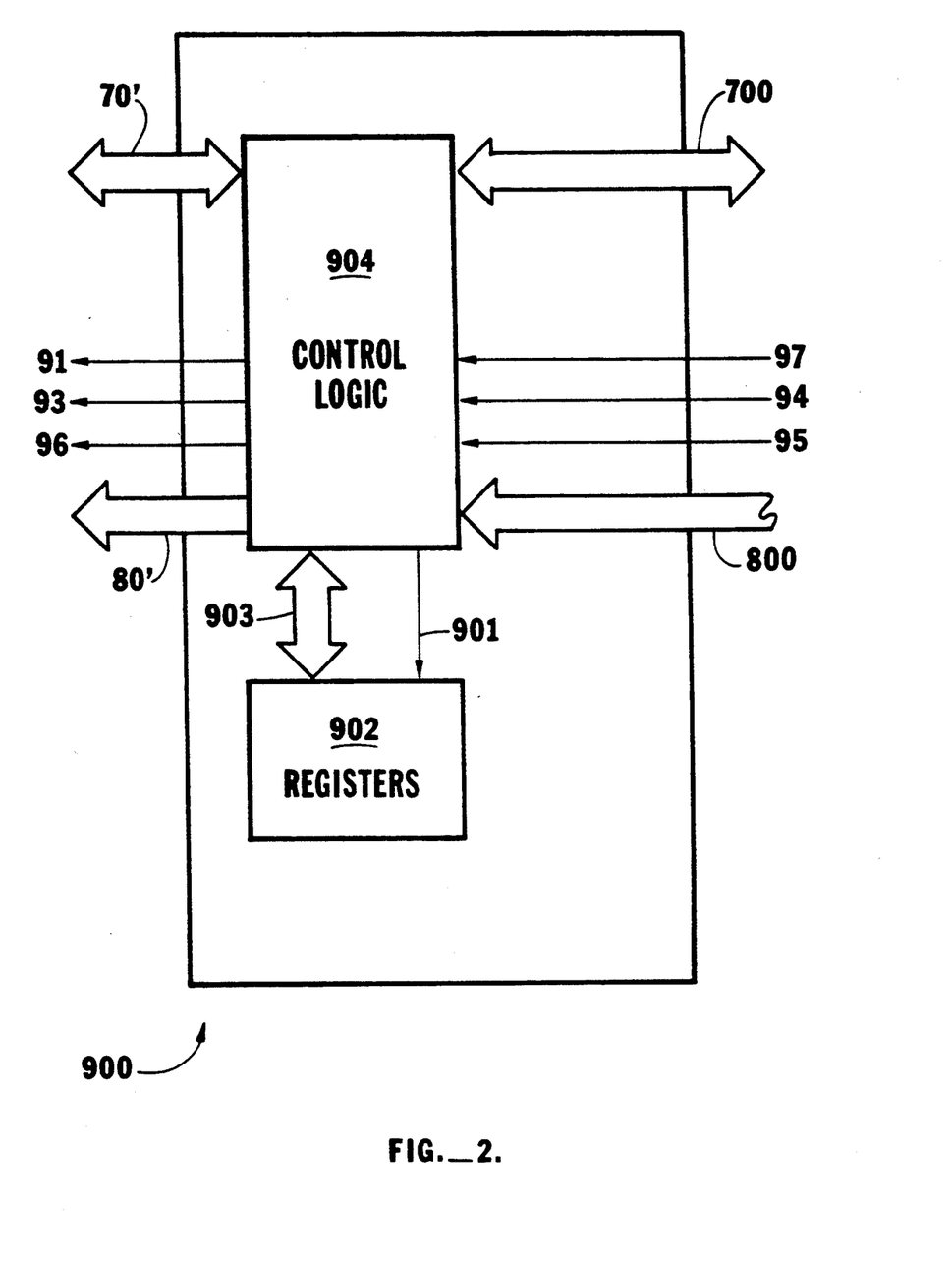
FIG. 2 illustrates, as an example, a block diagram of the logic circuitry utilizing aspects of the present invention shown in FIG. 1.

FIG. 1 illustrates, as an example, a block diagram of a bidirectional interrupt mechanism utilizing aspects of the present invention. A first and second processor, 10′ and 10″ respectively, send interrupt/acknowledge signals, interrupt vectors and other interrupt information to each other through logic circuitry 900.

For example, when the first processor initiates an interrupt intended for the second processor 10″, it activates certain control signals 97, and provides an interrupt vector and a pseudo register address on a system data bus 700 and system address bus 800, respectively. Logic circuitry 900 decodes the pseudo register address and causes the interrupt vector to be stored in a first memory queue (e.g., 970 in FIG. 4) predefined in a memory device 30. The first processor 10′ can then follow the initial interrupt vector with additional interrupt information by sequentially providing items of interrupt information on the system data bus 700 along with an appropriate pseudo register address on the system address bus 800.

Conversely, when the second processor 10″ initiates an interrupt intended for the first processor 10′, it also activates certain control signals 97, an interrupt vector and a pseudo register address over the system data bus 700 and the system address bus 800, respectively. The logic circuitry 900 then decodes the pseudo register address and causes the interrupt vector to be stored in a second memory queue (e.g., 980 in FIG. 4) predefined in the memory device 30. The second processor 10″ can then follow the initial interrupt vector with additional interrupt information by sequentially providing items of interrupt information on the system data bus 700 along with an appropriate pseudo register address on the system address bus 800.

Figure 3:
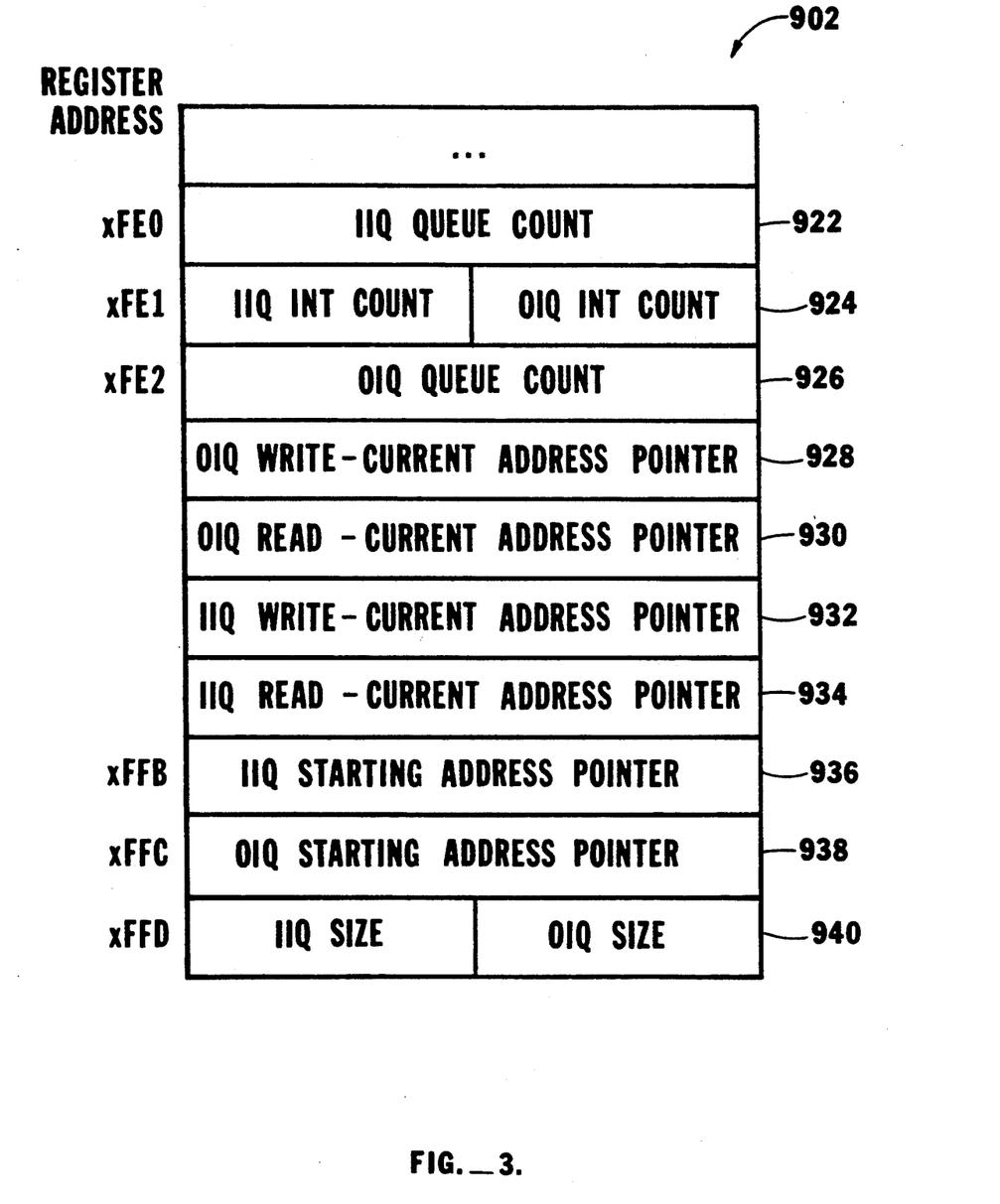
FIG. 3 illustrates, as an example, a plurality of registers utilizing aspects of the present invention shown in FIG. 1.
Figure 4:
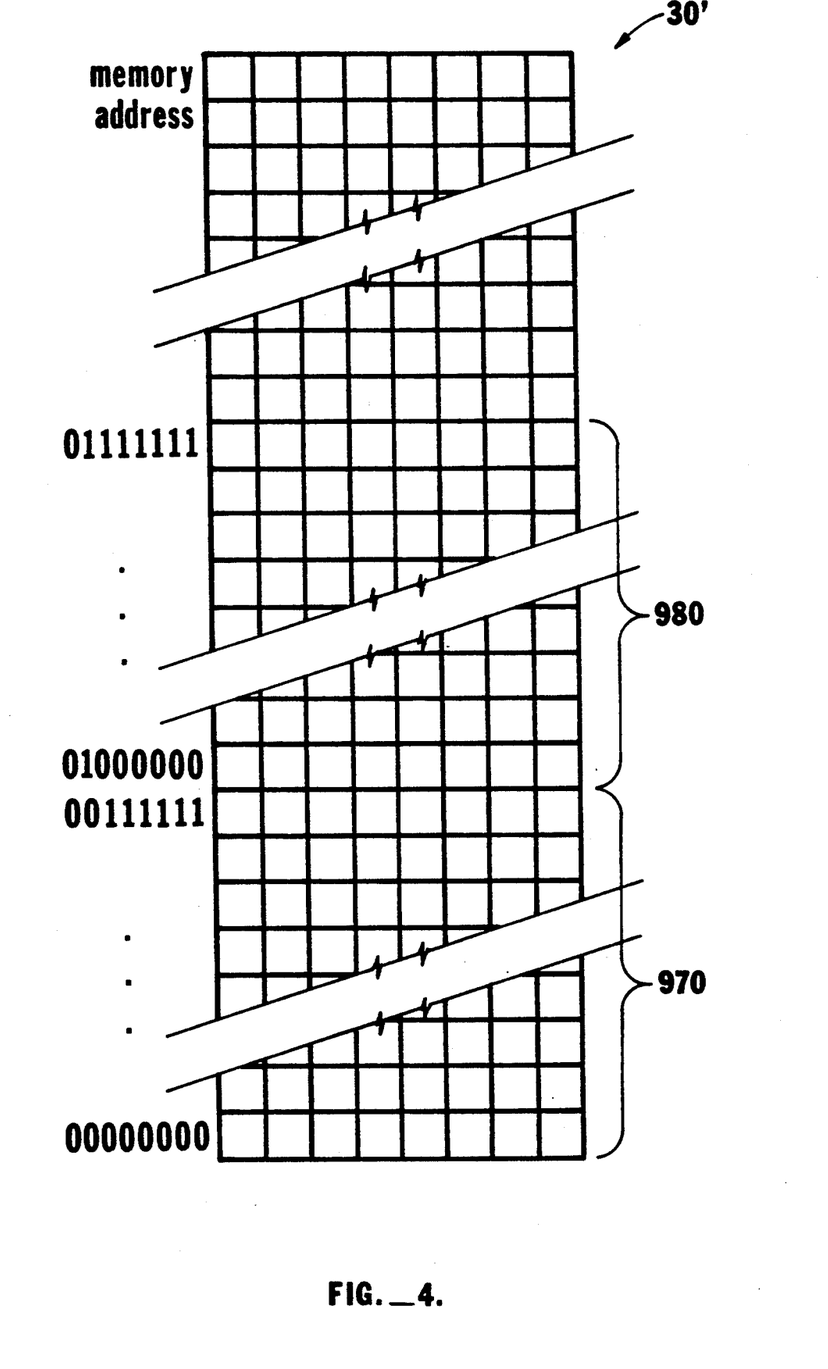
FIG. 4 illustrates, as an example, a dual memory queue structure utilizing aspects of the present invention in a memory device shown in FIG. 1.

Each processor has a separate, programmably defined memory area in the memory device 30′ for queuing interrupt information to be subsequently passed to the other processor. Referring to FIGS. 3 and 4, interrupt information being passed by the first processor 10′ to the second processor 10″ is queued in the memory queue 970 (referred to herein as an "inbound interrupt queue" or "IIQ") and interrupt information being passed by the second processor 10″ to the first processor 10′ is queued in the memory queue 980 (referred to herein as an "outbound interrupt queue" or "OIQ").

Either processor can programmably define one or both memory queues. For example, the IIQ and OIQ can be defined by either processor 10′ or 10″ providing starting addresses (within the addressing framework of the memory device 30′) and queue sizes for both queues to the logic circuitry 900. To do this, either device can store the starting IIQ address location in register 936 by concurrently providing the starting IIQ address (e.g., 00000000) on the system data bus 700 and the appropriate register address (e.g., xFFB, using hexadecimal coding and where "x" indicates that the value of the 4 MSBs doesn't matter) on the system address bus 800; can store the starting OIQ address in register 938 by concurrently providing the starting OIQ address (e.g., 01000000) on the system data bus 700 and the appropriate register address (e.g., xFFC) on the system address bus 800; and can store the queue sizes for both queues in register 940 by concurrently providing the queue sizes on the system data bus 700 and the associated register address (e.g., xFFD) on the system address bus 800. Although the IIQ and OIQ may be the same size, they do not necessarily have to be. For example, if the IIQ size is desired to be 64 and the OIQ size is desired to be 32, then 00110010 (which is code equivalent to 64 items of interrupt information in the IIQ and 32 items of interrupt information in the OIQ) can be provided by one of the processors, 10′ or 10″, on the system data bus 700 along with the appropriate register address (e.g., xFFD) on the system address bus 800.

As shown in FIG. 3, the queue defining registers 936, 938 and 940 are all part of a set of registers 902 contained in the logic circuitry 900. Included in this set of registers 902 are also two "read pointer" counters (e.g., 934 for IIQ and 930 for OIQ), two "write pointer" counters (e.g., 932 for IIQ and 928 for OIQ), two queue counters (e.g., 922 for IIQ and 926 for OIQ), and two interrupt counters (e.g., MSBs of 924 for IIQ and LSBs of 924 for OIQ, or separate registers for each).

Each "read pointer" indicates the memory address from which the next item of interrupt information is to be read out of its respective queue. Similarly, each "write pointer" indicates the memory address from which the next item of interrupt information is to be written into its respective queue. Initially, both of these pointers are set to the respective starting memory addresses of their respective queues (e.g., 00000000 for IIQ and 01000000 for OIQ). Thereafter, each time an item of interrupt information is written into or read out of its respective queue, the appropriate pointer is incremented accordingly.

Each of the "read pointers" and "write pointers" are "rolled over" to its respective queue starting address after having been used to read from or write to the last address of their respective queues (as determined from each queue's starting address and queue size) by blocking an appropriate carry bit while incrementing the contents of each register each time a word of interrupt information is read out or written into its respective queue. For example, if the queue size is programmably defined to be 64 words and the starting memory location for the queue is 00000000, then the carry to the seventh bit is blocked so that after the ending address, 00111111, the address "rolls over" to 00000000.

Each of the queue counters indicates the number of unread items of interrupt information in its respective queue, and each of the interrupt counters indicates the number of unread interrupts in its respective queue. For example, if the first processor 10' issues five interrupts to the second processor 10" before the second processor 10" responds to any of them, and each interrupt is associated with five items of interrupt information, then the IIQ queue counter 922 indicates the binary equivalent of the number twenty-five and the MSBs of the interrupt counter 924 indicate the binary equivalent of the number five. Thereafter, each time another interrupt is queued up in the IIQ, the MSBs of the interrupt counter 924 are incremented, and each time another item of interrupt information is stored in the IIQ, the IIQ queue counter 922 is incremented. Conversely, each time a queued up interrupt is acknowledged (or read out) by the second processor 10", the MSBs of the interrupt counter 924 are decremented, and each time an item of interrupt information is read out of the IIQ, the IIQ queue counter 922 is decremented.

Each time an interrupting processor and its controlling software desires to write another item of interrupt information into one of the queues, it should first check the queue to make sure that it is not "full" in order to prevent writing over unread data. For example, the first processor 10' can check whether the IIQ is full or not, by comparing the IIQ queue counter to the IIQ queue size. If the IIQ queue counter equals the IIQ queue size, then the IIQ is full and the interrupting processor should not try to write another item of interrupt information into the queue until it becomes "unfull." The first processor 10' can access these registers by providing the appropriate control signals 97 and the appropriate register addresses (e.g., xFE0 and xFFD) on the system address bus 800. The logic circuitry 900 can then provide the appropriate register contents to the first processor 10' on the system data bus 700. In a similar fashion, the second processor 10" can check whether the OIQ is full or not before attempting to write another a item of interrupt information into the OIQ.

In addition, the controlling software of either processor can check the appropriate queue counter or interrupt counter to see if any unread items of interrupt information or unacknowledged interrupts remain in its respective queue. For example, the second processor 10" can check if any unread items of interrupt information remain in the IIQ by providing the appropriate control signals and register address (e.g., xFE0 in FIG. 3) to the logic circuitry 900 via control lines 97 and the system address bus 800, respectively. In response, the logic circuitry 900 transmits the current value of the IIQ counter (e.g., 922 in FIG. 3) to the second processor 10" via the system data bus 700. If the current value of the IIQ queue counter is zero, this indicates that there are no unread items of interrupt information in the IIQ.

When either the first or second processor, 10' or 10", requests that an item of interrupt information be written into or read out of the IIQ or OIQ, it sends the appropriate control signals and an appropriate pseudo register address to the logic circuitry 900 via control lines 97 and the system address bus 800. The pseudo register address transmitted, does not correspond to an actual physical register. It is an encoding scheme which provides certain information to the logic circuitry 900 and directs it to take certain actions. Included among the information provided to the logic circuitry 900 is the identification of the requesting processor, 10' or 10", as well as, information regarding the action being requested by the requesting processor, 10' or 10".

Figure 5A:
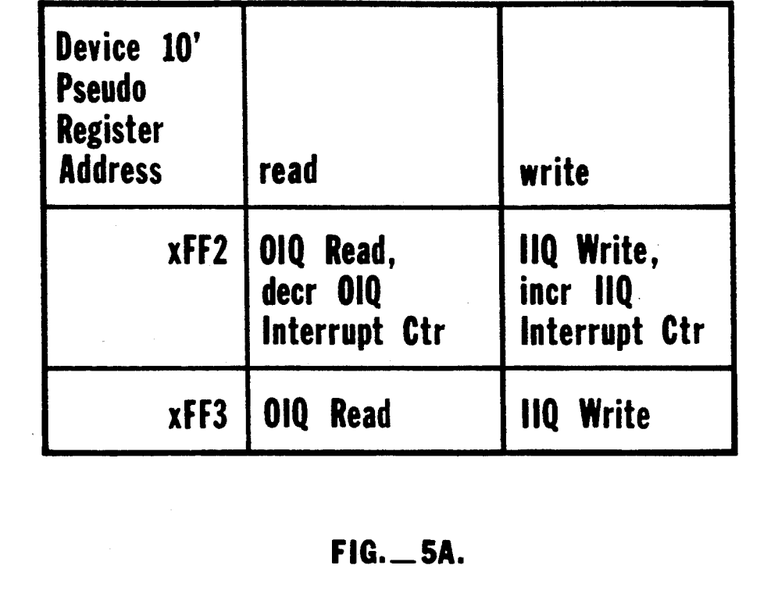
FIGS. 5A and 5B illustrate, as an example, a pseudo register address scheme utilizing aspects of the present invention.
Figure 5B:
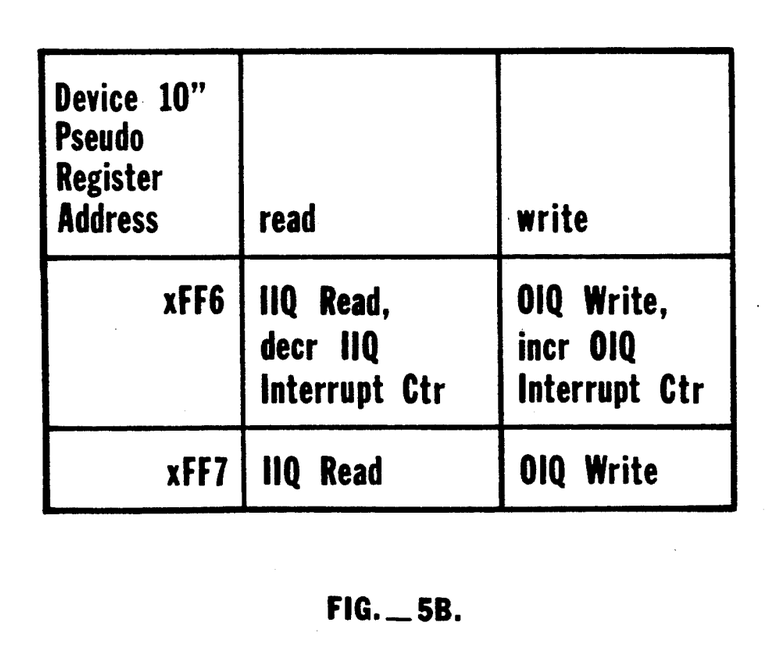

FIGS. 5A and 5B illustrate, as an example, a pseudo register address encoding scheme. In the example, if a pseudo register address of either xFF2 or xFF3 is received, then the logic circuitry 900 determines that it is processor 10' initiating the read or write request. Conversely, if a pseudo register address of either xFF6 or xFF7 is received, then the logic circuitry 900 determines that it is processor 10" initiating the read or write request. Control signals provided along control lines 97 then indicate whether a "read" request or "write" request is being made.

For example, if the logic circuitry 900 receives a write indication along control line 97, a pseudo register address (e.g., xFF3 in FIG. 3) on the system address bus 800, and an item of interrupt information on the system data bus 700, then the logic circuitry 900 determines that it is receiving the item of interrupt information from the first processor 10' and it is to write the received item of interrupt information into the IIQ (e.g., queue 970 in FIG. 4).

Upon receipt of the write indication and pseudo register address, the control logic 904 determines via a decoding scheme such as that depicted in FIGS. 5A and 5B, what control steps need to be taken. The control logic 904 causes the item of interrupt information provided by the first processor 10' to be stored in the memory device 30' by enabling the memory device 30' via control lines 91 while concurrently providing the item of interrupt information to be stored in the memory device 30' to the memory device 30' via data lines 70', and the appropriate memory address where the item of interrupt information is to be stored in the memory device 30' to the memory device 30 via address lines 80', where the appropriate memory address is obtained by the control logic 904 by retrieving it from the appropriate "write pointer" counter (e.g., 932 in FIG. 3).

The control logic 904 increments the IIQ "write pointer" counter (e.g., 932 in FIG. 3) and the IIQ queue counter (e.g., 922 in FIG. 3) each time an item of interrupt information is written to the IIQ. The IIQ interrupt counter (e.g., the MSBs of register 924 in FIG. 3), however, is only incremented when the last item of interrupt information associated with a particular interrupt, is written to the IIQ. To distinguish the different counter updating requirements associated with the last item of interrupt information with those associated with preceding items of interrupt information, a different pseudo register address is provided in the encoding scheme (e.g., xFF2 in FIG. 5A).

The interrupting device can pass any number of items of interrupt information to the interrupted processor, as long as the two devices preagree as to the number, or a coding protocol is used by which certain of the items indicate the number of following associated items of interrupt information. The IIQ interrupt counter (e.g., MSBs of 924 in FIG. 3) keeps track of the number of unacknowledged interrupts, and the IIQ queue counter (e.g., 922 in FIG. 3) keeps track of the number of unread items of interrupt information. For example, if the interrupting software on the first processor 10' preagrees with corresponding software on the second processor 10" that five items of interrupt information (including an interrupt vector, if appropriate) will be supplied with each interrupt, then it will first send four items of interrupt information along with the pseudo register address xFF3, then send a fifth item of interrupt information along with the pseudo register address xFF2. Thus, the IIQ queue counter (e.g., 922 in FIG. 3) will be incremented five times and the IIQ interrupt counter (e.g., MSBs of 924 in FIG. 3) will be incremented once after the fifth item of interrupt information is provided by the first processor 10'.

Whenever the IIQ interrupt counter is incremented such that it contains a nonzero value, the control logic 904 generates and transmits an interrupt signal to the second processor 10" via control lines 96 (FIG. 1). The second processor 10" typically responds to this interrupt signal by performing an interrupt acknowledge cycle which includes a request for an interrupt vector which points to an interrupt service routine ("ISR") that the interrupted processor 10" is to execute in response to the interrupt.

The processor 10" requests this interrupt vector by either transmitting an appropriate control signal (e.g., a read indication) and pseudo register address (e.g., xFF6 in FIG. 3) to the logic circuitry 900 via control lines 97 and the system address bus 800, respectively, or generating an interrupt acknowledge signal to the logic circuitry 900 via control lines 95. The control logic 904 in the logic circuitry 900 equivalently responds to either of these two events by obtaining the current item of interrupt information from the selected queue in the memory device 30' and thereupon, providing it to the second processor 10" via the system data bus 700.

Control logic 904 obtains the requested item of interrupt information from the memory device 30' by providing to the memory device 30, a memory address retrieved from the appropriate "read pointer" counter (e.g., 934 of FIG. 3), and appropriate enabling signals, via address lines 80' and control lines 91, respectively. The thus obtained item of interrupt information is then transmitted to the second processor 10" by latching it onto the system data bus 700.

In addition to obtaining the item of interrupt information from the memory device 30', the control logic 904 also updates the IIQ "read pointer" counter (e.g., 934 in FIG. 3) by causing it to be incremented, and updates the IIQ queue and interrupt counters (e.g., 922 and MSBs of 924 in FIG. 3) by causing them to be decremented. Subsequently, the ISR initiated by this interrupt vector can read supplementary items of interrupt information from the IIQ without decrementing the IIQ interrupt counter each time, by transmitting a different pseudo register address (e g., xFF7 in FIG. 5B) along with its read request signal.

As an example, if the first processor 10' provides five items of interrupt information for each interrupt, the second processor 10" responds to the interrupt signal received from the logic circuitry 900 via control lines 96, by sending a pseudo register address of xFF6 along with its first read request, then sending a pseudo register address of xFF7 along with the second through fifth read requests. Thus, the IIQ queue counter (e.g., 922 in FIG. 3) is decremented five times, once each time an item of interrupt information is transmitted to the second processor 10", and the IIQ interrupt counter (e.g., MSBs of 924 in FIG. 3) is only decremented once, which occurs when the first item of interrupt information (which is the interrupt vector associated with the pending interrupt) is provided to the second processor 10".

The handling of interrupts in the other direction, from the second processor 10" to the first processor 10', is done in a similar manner, except that a different queue, referred to herein for convenience as the "outbound interrupt queue" (e.g., OIQ queue 980 in FIG. 4) is defined in the memory device 30', and different queue registers corresponding to the OIQ are provided (e.g., OIQ "read pointer" counter, 930, OIQ "write pointer" counter, 928, OIQ queue counter, 926, and OIQ interrupt counter, MSBs of 924, in FIG. 3). This dual queue structure allows each processor to have its own buffer area defined in the memory device 30' for queuing its interrupts to the other processor. Since the OIQ has pseudo register addresses that parallel those of the IIQ, true bidirectional interrupt handling is achieved in the interrupt mechanism depicted in FIGS. 1-5.

Although the various aspects of the present invention have been described with respect to a preferred embodiment, it will be understood that the invention is entitled to full protection within the full scope of the appended claims. For example, numerous counters are used in the preferred embodiment which could also be implemented by using registers and means for incrementing or decrementing the contents of those registers.

What is claimed is:

1. A circuit for passing interrupt information between a first and second device, comprising:
   a memory device having a first plurality of sequentially addressed storage locations for storing items of interrupt information being passed from said first device to said second device, said first plurality of sequentially addressed storage locations having a beginning address in said sequence of addresses, an ending address in said sequence of addresses, and a size equal to said ending address minus said beginning address plus one;
   a first register having an addressed storage location for storing said beginning address in said sequence of memory addresses of said first plurality of sequentially addressed storage locations; and
   a second register having an addressed storage location for storing said size of said first plurality of sequentially addressed storage locations.

2. The circuit as recited in claim 1, said memory device further having a second plurality of sequentially addressed storage locations for storing items of interrupt information being passed from said second device to said first device, said second plurality of sequentially addressed storage locations having a beginning address in said sequence of addresses, an ending address in said sequence of addresses, and a size equal to said ending address minus said beginning address plus one, said circuit further comprising:
   a third register having an addressed storage location for storing said beginning address in said sequence of memory addresses of said second plurality of sequentially addressed storage locations; and
   a fourth register having an addressed storage location for storing said size of said second plurality of sequentially addressed storage locations.

3. The circuit as recited in claim 2 wherein said first and second devices are both processors.

4. A circuit for passing interrupt information between a first and second device, said first and second devices connected to said circuit by a system bus including an address bus, a data bus, and a control signal bus, said circuit comprising:
   a memory device having a first plurality of sequentially addressed storage locations for storing items of interrupt information being passed from said first device to said second device, said first plurality of sequentially addressed storage locations having a beginning address in said sequence of addresses, an ending address in said sequence of addresses, and a size equal to said ending address minus said beginning address plus one;

a first write address counter having an addressed storage location initially storing said beginning address of said first plurality of sequentially addressed storage locations;

a first interrupt counter having an addressed storage location initially storing an interrupt count of zero;

a first queue counter having an addressed storage location initially storing an item of interrupt information count of zero; and control logic connected to said memory device, said first write counter, said first interrupt counter, said first queue counter, and by said system bus, to said first and second devices, wherein said control logic causes an item of interrupt information received from said first device over said data bus to be stored in said first plurality of sequentially addressed storage locations, an address stored in said first write counter to be incremented to a next address in said sequence of addresses of said first plurality of sequentially addressed storage locations, and an item of interrupt information count stored in said first queue counter to be incremented by one, if said control logic receives a write signal over said control signal bus and a first or second pseudo register address over said address bus, and also causes an interrupt count stored in said first interrupt counter to be incremented by one, if said control logic receives said second pseudo register address over said address bus.

5. The circuit as recited in claim 4, said circuit further comprising a first read address counter connected to said control logic, said first read address counter having an addressed storage location initially storing said beginning address of said first plurality of sequentially addressed storage locations, wherein said control logic causes an item of interrupt information retrieved from said first plurality of sequentially addressed storage locations at an address stored in said first read address counter to be provided on said data bus, said address stored in said first read address counter to be incremented to a next address in said sequence of addresses of said first plurality of sequentially addressed storage locations, and said item of interrupt information count stored in said first queue counter to be decremented by one, if said control logic receives a read signal over said control signal bus and said first or second pseudo register address over said address bus, and also causes said interrupt count stored in said first interrupt counter to be decremented by one, if said control logic receives said second pseudo register address over said address bus.

6. The circuit as recited in claim 4, said memory device further having a second plurality of sequentially addressed storage locations for storing items of interrupt information being passed from said second device to said first device, said second plurality of sequentially addressed storage locations having a beginning address in said sequence of addresses, an ending address in said sequence of addresses, and a size equal to said ending address minus said beginning address plus one, said circuit further comprising:

a second write address counter connected to said control logic, said second write register having an addressed storage location initially storing said beginning address of said second plurality of sequentially addressed storage locations;

a second interrupt counter having an addressed storage location initially storing an interrupt count of zero; and a second queue counter having an addressed storage location initially storing an item of interrupt information count of zero;

wherein said control logic is also connected to said second interrupt counter and said second queue counter, and causes an item of interrupt information received from said second device over said data bus to be stored in said second plurality of sequentially addressed storage locations, an address stored in said second write counter to be incremented to a next address in said sequence of addresses of said second plurality of sequentially addressed storage locations, and an item of interrupt information count stored in said second queue counter to be incremented by one, if said control logic receives a write signal over said control signal bus and a third or fourth pseudo register address over said address bus, and also causes an interrupt count stored in said second interrupt counter to be incremented by one, if said control logic receives said fourth pseudo register address over said address bus.

7. The circuit as recited in claim 6, said circuit further comprising a second read address counter connected to said control logic, said second read address counter having an addressed storage location initially storing said beginning address of said second plurality of sequentially addressed storage locations, wherein said control logic causes an item of interrupt information retrieved from said second plurality of sequentially addressed storage locations at an address stored in said second read address counter to be provided on said data bus, said address stored in said second read address counter to be incremented to a next address in said sequence of addresses of said second plurality of sequentially addressed storage locations, and said item of interrupt information count stored in said second queue counter to be decremented by one, if said control logic receives a read signal over said control signal bus and said third or fourth pseudo register address over said address bus, and also causes said interrupt count stored in said second interrupt counter to be decremented by one, if said control logic receives said fourth pseudo register address over said address bus.

8. A method of receiving interrupt information from a first device, queuing said interrupt information in a memory device, signaling a second device after said queuing, and transmitting said queued interrupt information to said second device upon request by said second device, comprising the steps of:

(a) receiving a write signal from a control signal bus, an item of interrupt information from a data bus, and a pseudo register address from an address bus, wherein said pseudo register address indicates from which device said item of interrupt information is being sent;

(b) retrieving a memory address from a first selected one of a plurality of registers in response to said write signal and said pseudo register address;

(c) causing said item of interrupt information to be stored in said memory device at said retrieved memory address;

(d) updating the memory address stored in said first selected one of said plurality of registers; and incrementing, if said pseudo register address is a first or second pseudo register address, a queue counter containing a count of the number of items of unread interrupt information that have been passed from said first device to said second device and stored in said memory device, and also incrementing, if said pseudo register address is said second pseudo register address, an interrupt counter containing a count of the number of unread interrupts that have been initiated by said first device for said second device.

9. The method as recited in claim 8 further comprising the steps of:
(g) checking the contents of said interrupt counter, and generating and transmitting an interrupt signal to said second device if said contents are not equal to zero;
(h) receiving a read signal from said control signal bus, and a pseudo register address from said address bus;
(i) retrieving a memory address from a second selected one of said plurality of registers in response to said read signal and said pseudo register address;
(j) providing a read signal and said retrieved memory address to said memory device, and receiving an item of interrupt information from said memory device in response thereof;
(k) transmitting said received item of interrupt information to said second device;
(l) updating the memory address stored in said second selected one of said plurality of registers; and
(m) decrementing said queue counter if said pseudo register address is a third or fourth pseudo register address, and also decrementing said interrupt counter if said pseudo register address is said fourth pseudo register address.

10. The method as recited in claim 8 wherein said (d) comprises the steps of:
(d1) incrementing the memory address stored in said first selected one of said plurality of registers; and
(d2) blocking an appropriate carry bit determined from the contents of a queue size register.

11. The method as recited in claim 8 further comprising the steps of:
(g) checking the contents of said interrupt counter, and generating and transmitting an interrupt signal to said second device if said contents are not equal to zero;
(h) receiving an interrupt acknowledge signal from said second device;
(i) retrieving a memory address from a second selected one of said plurality of registers in response to said interrupt acknowledge signal;
(j) providing a read signal and said retrieved memory address to said memory device, and receiving an item of interrupt information from said memory device in response thereof;
(k) transmitting said received item of interrupt information to said second device;
(l) updating the memory address stored in said second selected one of said plurality of registers; and
(m) decrementing said queue counter if said pseudo register address is a third or a fourth pseudo register address, and also decrementing said interrupt counter if said pseudo register address is said fourth pseudo register address.

* * * * *